Aug. 14, 1962 H. PETERKA 3,049,323
FIXING MEANS FOR FIXING OBJECTS TO A WALL
Filed April 18, 1960
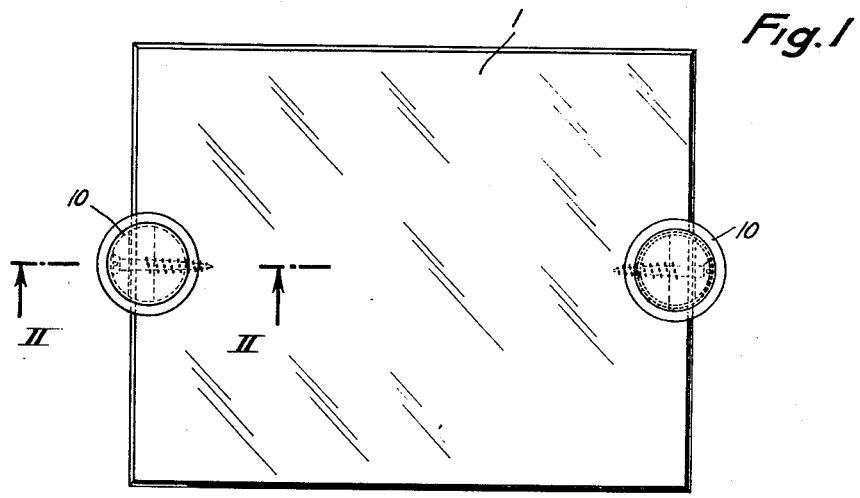
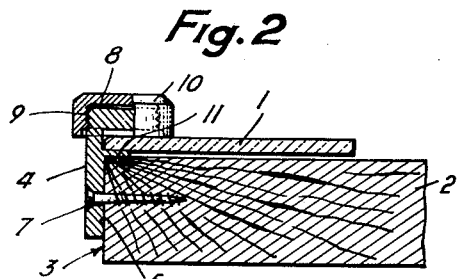
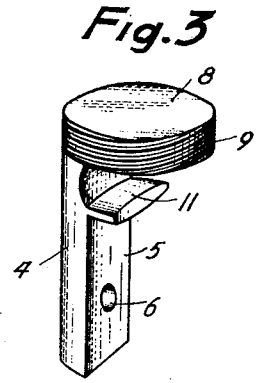
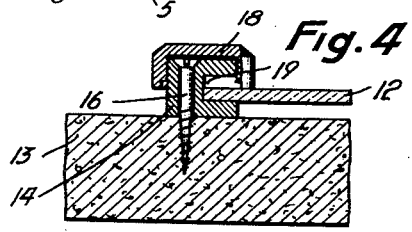
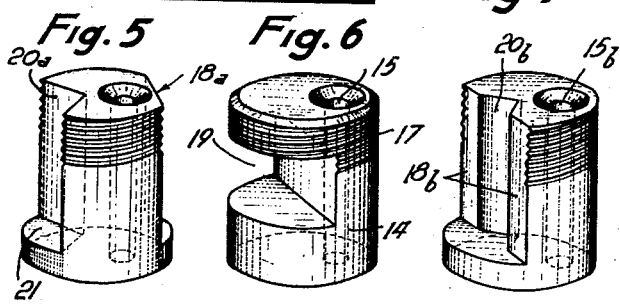
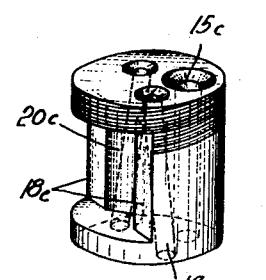
Inventor
HENRI PETERKA
By Toulmin & Toulmin
Attorneys … # 3,049,323
FIXING MEANS FOR FIXING OBJECTS TO A WALL
Henri Peterka, 34 Blvd. Richard-Lenoir, Paris, France
Filed Apr. 18, 1960, Ser. No. 23,051
Claims priority, application France Apr. 21, 1959
6 Claims. (Cl. 248—28)

The present invention relates to improvements in fixing means for fixing objects to a wall and in particular mirrors and the like, these improvements being preferably used in combination, since they then afford maximum advantage but they can also be used separately without departing from the scope of the invention.

For fixing mirrors to a subjacent surface there already exist mirror fixing means comprising a pillar or core which is externally screw-threaded and provided with an eccentric throughway aperture parallel with the axis of said screw threading for the passage of a fixing element, such as a nail or screw, this core being applied at one of its ends perpendicular to the screw threading against the subjacent surface in such manner as to bear laterally against the mirror there being a clamping knot screwed on the opposite end of this core and bearing against the visible surface of the mirror.

A first improvement resides in the fact that a recessed part of the core body carrying the clamping knot, which permits bringing the core near enough to the mirror, is such as to leave projecting therefrom a part adjacent said recessed part so that this projecting part is able to engage under the rear surface of the mirror and act as a support therefor by holding it away from the subjacent surface. In order that fixing means of this type having a pillar provided with an aperture parallel with the axis of the screw threading be universal, that is, be of use both against the straight or curved edge of the mirror and against a corner of the latter, the pillar has, in the known manner, two recessed parts, and the latter are preferably disposed in such manner that said projecting parts are at the same end of the pillar, thereby permitting merely the end of the aperture at the opposite end of the pillar to be machined or countersunk. An improvement in this arrangement is that one of the two recessed parts constituted in the known manner by a V-shaped longitudinal groove extends more deeply into the pillar than the other recessed part and is provided in the middle of the latter.

In any case, it is advantageous from the aesthetic point of view that the screw-threaded part of the pillar extend only over such height that it is substantially entirely above the visible surface of the mirror, the remainder of the pillar being unthreaded and if desired left smooth, nickel plated, enamelled or provided with any other embellishment.

Another improvement is that the means fixing an object to a wall are constituted by the combination with an apertured ear, forming part of said object or capable of being fixed thereto, of a fixing means comprising a core applied at one end against the fixing wall and provided with at least one aperture extending throughout the core and transversely of said wall for the passage of a fixing element which is inserted in said wall, the opposite end of said core being capable of passing through the aperture of said ear and being externally screw-threaded for receiving a head, or cap, for clamping the latter.

In a specific embodiment which reduces the dimensions of the fixing means, the screw-threaded part of the core has a smaller diameter than the rest of the core so that there is afforded a projecting base for supporting the core on the wall.

Another improvement, which could be combined with any of the aforementioned improvements, is that an aperture in the core for the passage of a fixing element is inclined relative to the support surface of the core and that preferably a plurality of inclined apertures extend through this core. In this way a true anchoring in the wall is achieved.

The accompanying drawing shows by way of non limitative examples various embodiments of mirror fixing means according to the invention.

In the drawing:

FIG. 1 is an elevational view of a mirror or sheet of glass held in position by fixing means fixed laterally against the edges of a supporting panel under the mirror;

FIG. 2 is a sectional view perpendicular to the bearing surface of the fixing means and taken through the axis of the latter;

FIG. 3 is a perspective view on an enlarged scale of the fixing means shown in FIGS. 1 and 2;

FIG. 4 is a view similar to FIG. 2 of a mirror or sheet of glass held in position by fixing means the end of which is applied to a surface under the mirrors and extending beyond the periphery of the latter, and FIGS. 5, 6, 7 and 8 are perspective views on an enlarged scale of modifications of fixing means which can be used in the arrangement shown in FIG. 4.

FIGS. 1 and 2 show a mirror or sheet of glass 1 and a support panel 2 on which the mirror is to be fixed. The panel 2 has, in the presently-described embodiment, exactly the same dimensions as the mirror 1, but it could be slightly smaller than or project slightly from the mirror to an extent that does not allow fixing means to be fixed to the projecting part of the face of the panel 2 subjacent to the mirror 1. The fixing means is therefore fixed to the edge 3 of the panel 2 and comprises to this end a pillar 4 having a face 5 adapted to be applied against said edge. This pillar 4 is provided with a throughway aperture 6 having an axis perpendicular to the face 5 and for the passage of a fixing element, for example a screw 7 driven into the panel 2. This pillar 4 extends beyond the upper face of the panel 2 and terminates at its upper end in a projecting part 8 or head which overhangs said upper face of the panel 2. This head 8 carries an external screw threading 9 whose axis is perpendicular to the upper face of the panel 2 and on which a knob 10 is screw-threadedly engaged. The fixing means is slid between the upper face of the panel 2 and the projecting part or head 8, and the knob 10 is screwed on the screw threading 9 until it is clamped against the upper face of the mirror 1.

In order to hold the mirror 1 slightly away from the support 2 to ventilate its rear face, the pillar 4 has between the aperture 6 and the head 8 a small lug 11 projecting from the face 5, the space between the lug 11 and the head 8 being greater than the conventional thickness of the mirrors or sheets of glass the fixing means is intended for. The mirror is slid between the lug 11 and the overhanging part of the head 8 and rests on the lug against which it is clamped by the clamping knob 10 (FIG. 2). It is advantageous to arrange, so that the mirror does not bear against a sharp edge in the event that the fixing means is defectively fixed in position, that the upper face of the lug 11 be slightly cambered or curved as shown in FIG. 3. The other face of the lug 5, which is also advantageously curved, preferably bears against the upper face of the panel 2. In this way, the different fixing means used for holding the mirror are all fixed at the same level and the mirror is parallel with the upper face of the panel 2.

In the embodiment shown in FIG. 4, the mirror 12 is to be fixed on a subjacent surface 13 which extends beyond the mirror, for example a wall. In this case, fixing means are used which comprise a pillar or core 14 one end of which is applied against the visible face of the subjacent surface, there being a throughway aperture 15 provided therein perpendicular to said subjacent face for the passage of a fixing element, such as a nail or screw 16. This pillar carries an external screw threading 17 on which a clamping knob 18 is screw-threadedly engaged, the latter bearing against the visible face of the mirror 12 and thus holding it in position. This pillar 14 has a recessed part 19 in which the edge of the mirror is engaged and which permits the pillar to be positioned sufficiently near to this edge for the clamping knob 18 to sufficiently overhang the mirror 12. This recessed part 19 does not extend over the entire height of the pillar 14 down to the face of the latter which bears against the subjacent face, so that a part of the pillar is left which is engaged under the underside of the mirror and maintains the latter separated from the subjacent face and thus perform the function of the lug 11. Thus the mirror rests on the upper face of this unrecessed part of the pillar 14.

To permit use of the same fixing means both along a straight or curved edge of a mirror and against a corner of the latter, it is merely necessary to provide the pillar 14 with two recessed parts as shown in FIGS. 5, 7 and 8, one of these recessed parts being constituted by a V-shaped groove or notch in which a corner of a mirror can be lodged.

In the embodiment shown in FIG. 5, this longitudinal V-shaped groove is designated by the reference character 20a whereas the other recessed part is designated by the reference character 18a. The longitudinal groove 20a does not extend down to the face of the pillar applied against the subjacent face but leaves a part 21 of the pillar free over a certain height, and it is on the upper face of this unrecessed part 21 that the corner of the mirror rests so that the latter is held away from the subjacent support.

In the modification shown in FIG. 7, the longitudinal V-shaped groove 20b and the other recessed part 18b are provided on the same side of the aperture 15b for the passage of the fixing element, the V-shaped groove being provided in the middle of the recessed part 18b.

In these two embodiments it is always the same end of the pillar which is applied against the subjacent surface, whether the fixing means be placed against a straight or curved edge of the mirror or against a corner of the latter. Therefore, it is sufficient, for the purpose of receiving the head of the fixing element, to countersink or recess the end of the aperture opposite the end thereof adjacent the end of the pillar resting on the subjacent surface. It could also be arranged—although this is less advantageous since it is then necessary to countersink both ends of the aperture for the fixing element and screw-thread both ends of the pillar—that the unrecessed parts of the pillar which act as a support base for the mirror be situated one at one end of the pillar and the other at the other end. In this case, it is necessary to invert the pillar to use it against a corner or against a side of the mirror.

In the modification shown in FIG. 8, the recessed parts 18c and 20c do not extend up to the opposite ends of the pillar 14c so that both ends of the latter are unrecessed. This modification could comprise either, as shown, recessed surfaces disposed as shown in FIG. 7, that is, on the same side of the aperture 15c for the fixing element, or recessed surfaces disposed as shown in FIG. 5, that is, on either side of said aperture or around the latter.

FIG. 8 also shows straight apertures 23 which communicate with the opposite parallel faces of the body 14c, extend through the latter and are inclined relative to these two faces. These apertures are provided for the passage of fixing nails or screws. If nails are used, the diameter of the latter must correspond to that of the aperture so that they are well guided therein and prevented from buckling when driving them into the subjacent support. The fact that these nails or screws are driven in obliquely very much reinforces the resistance of the body of the fixing means to being wrenched away from the subjacent support and a true anchoring is achieved; they could even entirely replace the fixing screw extending through the aperture 15c. The latter could be dispensed with or could also be used for driving in a further nail; it could also be inclined in the same way as the apertures 23. The latter are preferably non-parallel with one another.

In the case of mounting on walls composed of materials which do not permit use of screws without plugs, such as for instance stone, bricks, concrete, these inclined nails, in eliminating screws also dispense with the necessity of prior wall-plugging. If it is nonetheless retained in the case of particularly crumbly and relatively loose material, for example plaster, it is more easily carried out as it does not need to be so precise.

Similar inclined apertures could of course also be used with the same advantages in the embodiments shown in FIGS. 5 to 7.

The embodiments shown in FIGS. 5, 6, 7 and 8 have the further advantage over that in which the pillar is screw threaded at both ends, in that once the clamping knob is in position, no screw-threaded part is visible and no embellishment is needed particularly in the embodiments shown in FIGS. 6, 7 and 8, the pillar being so treated that its visible surface is pleasant to the eye; for example, it could be left smooth, nickel plated, chromium plated or enamelled, or it could be provided with another embellishment.

The fixing means described hereinbefore can be produced by turning, and machining operations, but they could also be produced by dying or moulding. They could also be made of synthetic resin, for example that known under the trade name "Rilsan."

The fixing means could then be coloured throughout its mass. Further, production by dying or moulding permits decorating the visible face of the pillar with recesses or projections in any desired way.

Instead of fixing mirrors, the fixing means described hereinbefore, especially when they comprise inclined apertures for the passage of nails (since prior wall-plugging is thus unnecessary), could advantageously be used for fixing objects provided with projecting ears having apertures normally provided for the passage of fixing screws, on condition that the screw-threaded part of the core or body of the fixing means is able to extend through the ear in passing through one of the apertures. These fixing means could then be circular throughout their circumference and height. They further permit easily removing the mounted objects and subsequently fixing them back in position just as rigidly, which is not so easy to do with usual fixing arrangements having screws extending through ears. The screw-threaded part could then have a smaller diameter and which thus provides a projecting support base which alone is traversed by inclined apertures, whose inclination could then be considerable. This arrangement is of particular interest for mounting on thin walls, for example plywood or thin wood walls. This support base could fit into a small cup provided in the ear of the object to be fixed in position.

It must be understood that the invention is in no way limited to the embodiments described or shown, which have been given merely by way of example.

What I claim is:

1. In a fixing means for fixing a mirror to a wall like support, including an externally screw-threaded stem provided with at least one throughway hole adapted to accommodate a fixing element adapted to be driven into said support and thereby secure said stem to the latter in a position where said screw-threaded stem will extend at least partly on one side of said support, and a clamping screw-threaded knob screw-threaded on that latter part of said screw-threaded stem to engage the mirror to be clamped and hold it in position, said stem having two end faces substantially perpendicular to the screw-thread axis and through which extend said throughway hole so that it will bear against the mirror support by one of said end faces, a lug like projection provided on said latter part of said stem transversely to the screw-thread axis and adjacent said bearing end face in a position where it will be located on the said one side of the support when the stem is secured in said mirror clamping position and thereby provide a rest for the mirror, so that the latter will be clamped between said knob and lug, and a second lug shaped to accommodate a mirror corner provided on said stem adjacent said bearing end face, so that said fixing means may be used as well along a mirror edge as at a mirror corner.

2. In a fixing means as in claim 1, said throughway hole being countersunk only on the end face opposite said bearing end face.

3. In a fixing means as in claim 1, said stem being substantially cylindrical and provided with two oppositely located cut away parts extending over only a part of its length whereby said two lugs are provided by the two non cut-away cylindrical parts of the stem, one of said cut-away stem parts being flat and the other of V-shaped cross-section to accommodate a mirror corner.

4. In a fixing means for fixing a mirror to a wall like support, including an externally screw-threaded stem provided with at least one throughway hole adapted to accommodate a fixing element adapted to be driven into said support and thereby secure said stem to the latter in a position where said screw-threaded stem will extend at least partly on one side of said support, and a clamping screw-threaded knob screw-threaded on that latter part of said screw-threaded stem to engage the mirror to be clamped and hold it in position, said stem having two end faces substantially perpendicular to the screw-thread axis and through which extend said throughway hole so that it will bear against the mirror support by one of said end faces, a lug like projection provided on said latter part of said stem transversely to the screw-thread axis and adjacent said bearing and face in a position where it will be located on the said one side of the support when the stem is secured in said mirror clamping position and thereby provide a rest for the mirror, so that the latter will be clamped between said knob and lug, and said stem being substantially cylindrical and provided with a flat longitudinal cut-away part extending over only a part of its length, whereby said lug is provided by the non cut-away cylindrical part of the stem.

5. In a fixing means as in claim 4, said flat longitudinal cut-away part being provided along its whole length with a longitudinal groove of V-shaped cross-section to accommodate a mirror corner.

6. In a fixing means as in claim 5, said throughway hole being countersunk only on the end face other than the bearing one.

References Cited in the file of this patent

UNITED STATES PATENTS

| | | |
|---|---|---|
| 1,682,584 | Steel | Aug. 28, 1928 |
| 2,143,608 | Morris | Jan. 10, 1939 |
| 2,940,712 | Lloyd-Young | June 14, 1960 |

FOREIGN PATENTS

| | | |
|---|---|---|
| 794,461 | France | Dec. 12, 1935 |